(No Model.) 2 Sheets—Sheet 1.

J. B. WOOD.
GATE FOR RAILWAY CARS.

No. 411,974. Patented Oct. 1, 1889.

WITNESSES.
James W. Beaman.
John S. Lynch.

INVENTOR.
John B. Wood
per S. Scholfield
attorney

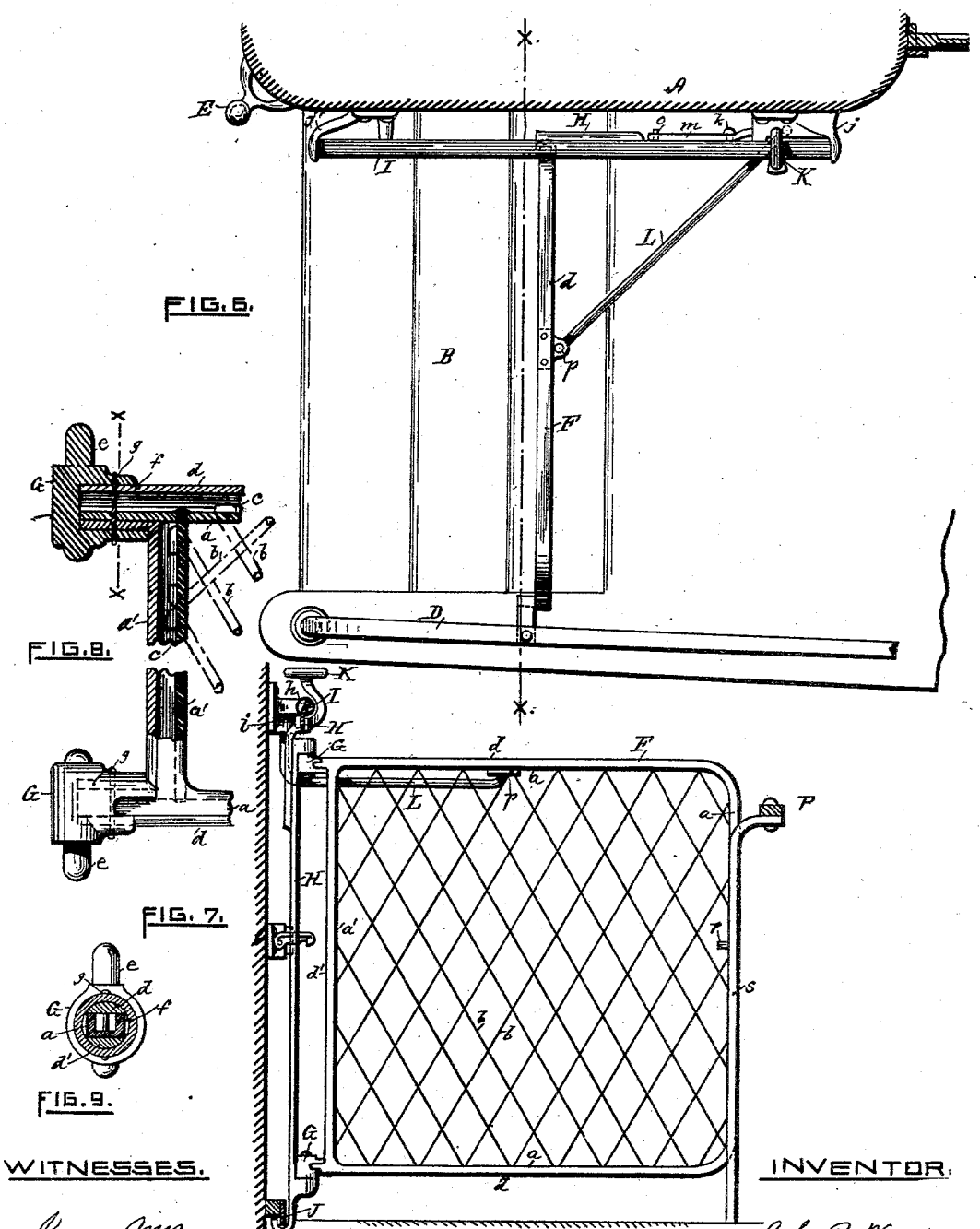

UNITED STATES PATENT OFFICE.

JOHN B. WOOD, OF PROVIDENCE, RHODE ISLAND.

GATE FOR RAILWAY-CARS.

SPECIFICATION forming part of Letters Patent No. 411,974, dated October 1, 1889.

Application filed June 5, 1889. Serial No. 313,185. (No model.)

*To all whom it may concern:*

Be it known that I, JOHN B. WOOD, a citizen of the United States, residing at Providence, in the State of Rhode Island, have invented a new and useful Improvement in Gates for Railway-Cars or other Purposes, of which the following is a specification.

My invention consists in a gate hinged or jointed to a movable support, whereby when the gate is moved for either opening or closing the same the jointed side of the gate and its support will be moved either inwardly or outwardly, thus adapting the gate to occupy a very small space in turning; and it also consists in the improved construction of the gate, as hereinafter fully set forth.

Figure 2:
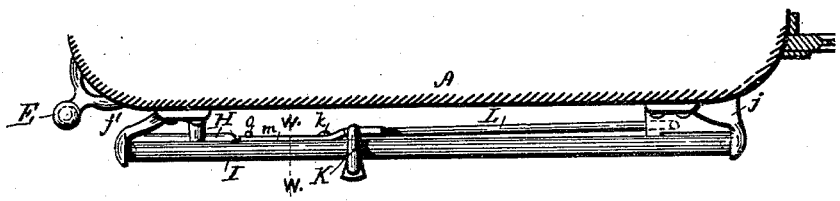
Figure 3:
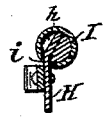
Figure 4:
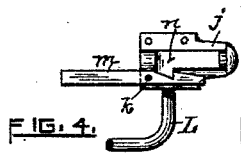
Figure 5:
Figure 1:
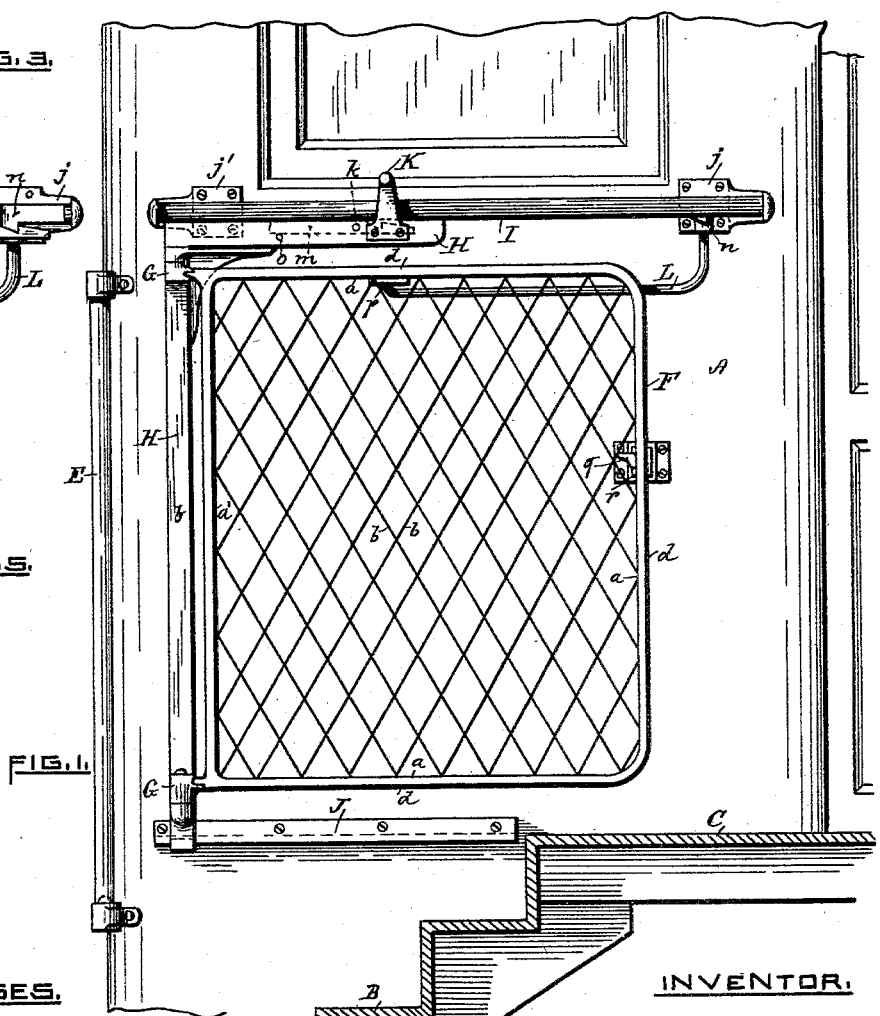

Figure 1 represents a side elevation of the open gate at the end of the car. Fig. 2 represents a top view of the gate, taken in the position shown in Fig. 1. Fig. 3 represents a section taken in the line $ww$ of Fig. 2. Figs. 4 and 5 are detail views. Fig. 6 represents a top view of the gate in its closed condition. Fig. 7 is a side elevation of the gate in its closed condition. Fig. 8 is a detail sectional view showing the approved mode of attaching the pintles to the gate. Fig. 9 is a transverse section taken in the line $xx$ of Fig. 8.

In the accompanying drawings, A represents the end of the car; B, the steps; C, the platform; D, the hand-rail at the forward end of the platform, and E the hand-rail at the corner of the car.

The gate F is formed of pieces of channel-iron $a\,a'$, as shown in the sectional views, Figs. 8 and 9, and the cross-wires $b\,b$ of the gate have their ends secured within the grooves $c$ of the channel-bars $a\,a'$ by bending, as shown in Fig. 8, and over the groove $c$ in the channel-bars are placed the rounded bands $d\,d'$, thus concealing the groove $c$ and the ends of the wires $b\,b$. The channel-bar $a$ is bent so as to form the bottom, end, and top of the gate, and the channel-bar $a'$ is riveted between the ends of the channel-bar $a$, as shown in Fig. 8. The gate-pintles $e$ are formed upon a pintle-piece G, having a circular socket $f$, as shown in Fig. 9, and the rounded band $d'$ at the back of the channel-bar $a'$ is bent at right angles at each end, so as to extend backward along the flat side of the projecting ends of the channel-bar $a$, thus causing the projecting ends of the channel-bar $a$ and the rounded bands $d$ and $d'$ to fit the cylindrical socket $f$ of the pintle-piece G, within which they are securely fastened by means of a pin $g$, thus forming a strong and durable attachment of the pintle to the gate.

The gate F, as shown in Fig. 1, is jointed to an inverted-L-formed bar H, which at its upper edge is made to fit within the cavity $h$ of the tube I, which is provided with a slot $i$, as shown in Fig. 3, extending from end to end at the under side of the tube, the said tube being secured to the end A of the car by means of the end brackets $j\,j'$.

The lower end of the bar H is made in hook form and embraces the guide J, which is attached to the end A of the car, and to the upper portion of the bar H is attached the operating-handle K. At the back of the bar H, at the point $k$, is pivoted the latch $m$, which, when the bar H is pulled forward by means of the handle K, will engage with the catch $n$, formed upon the bracket $j$, and the weighted end of the latch $m$ is prevented from falling by means of the stop-pin $o$.

The gate F is connected to the bracket $j$ by means of the bar L, which is jointed to the bracket $j$ for horizontal movement and also jointed to the gate F at the point $p$, and to the end A of the car is attached the latch $q$, which, when the gate is thrown back to the position shown in Figs. 1 and 2, engages with the catch-pin $r$ upon the gate.

In operating the gate to close the same from the position shown in Figs. 1 and 2 the latch $q$ is to be raised by one hand, while, with the other upon the handle K, the bar H is to be drawn inward, thus bringing the gate to the position shown in Figs. 5 and 6, in which the end of the gate is brought against the upright bar $s$ and the latch $m$ will engage with the catch $n$, thus holding the gate firmly in its shut position; and when it is desired to open the gate the weighted end of the latch $m$ is to be raised, thus disengaging the latch from the catch $n$, and then by pushing outward upon the handle K the gate will be brought back to the position shown in Figs. 1 and 2.

By the employment of the tube I, having a slot *i* for guiding the upper end of the bar H, I am able to protect the slide from dust and also from water, and thus prevent the obstruction of the slide by freezing in winter.

The gate may be arranged to close by swinging inward instead of outward, if desired, and the bar H will in that case be moved outward instead of inward to close the gate.

The guiding-rod L serves to brace the gate and also to guide and control its movement, so that it will be caused to open and close in the space required.

I claim as my invention—

1. A gate for railway-cars or other purposes, jointed to a support which is adapted for inward and outward movement in operating the gate, substantially as described.

2. A gate for railway-cars or other purposes, jointed to a support which is adapted for inward and outward movement in operating the gate, and provided with the guiding-rod to control the opening and closing movement, substantially as described.

3. The slotted guide-tube adapted to guide the supporting-bar of the gate, substantially as described.

4. A gate for railway-cars or other purposes, jointed to a support which is adapted for inward and outward movement in operating the gate, in combination with a latch for holding the gate in position, substantially as described.

5. A gate for railway-cars or other purposes, formed with the cross-wires, the channel-bars, and the rounded bands, and provided with the pintle-pieces, substantially as described.

6. A gate for railway-cars or other purposes, jointed to a support which is adapted for inward and outward movement in operating the gate and held in a guide-tube slotted at its under side, substantially as and for the purpose specified.

JOHN B. WOOD.

Witnesses:
JOHN S. LYNCH,
SOCRATES SCHOLFIELD.